(12) United States Patent
Charest et al.

(10) Patent No.: US 9,951,474 B2
(45) Date of Patent: *Apr. 24, 2018

(54) FIBERBOARDS, USES AND METHODS OF PREPARATION THEREOF

(75) Inventors: Yves Charest, Ancienne-Lorette (CA); André Verville, Laval (CA)

(73) Assignees: Uniboard Canada Inc., Laval (CA); EXP Services Inc., Brampton, Ontario (*) Notice: Subject to any disclaimer, the term of this patent is extended or adjusted under 35 U.S.C. 154(b) by 0 days.

This patent is subject to a terminal disclaimer.

(21) Appl. No.: 12/908,967

(22) Filed: Oct. 21, 2010

(65) Prior Publication Data

US 2011/0056635 A1    Mar. 10, 2011

Related U.S. Application Data

(63) Continuation of application No. 11/840,456, filed on Aug. 17, 2007.

(60) Provisional application No. 60/822,852, filed on Aug. 18, 2006.

(51) Int. Cl.
| | |
|---|---|
| *D21H 21/00* | (2006.01) |
| *D21H 17/01* | (2006.01) |
| *D21B 1/32* | (2006.01) |
| *D21J 1/00* | (2006.01) |
| *D21H 17/08* | (2006.01) |
| *D21H 17/49* | (2006.01) |

(52) U.S. Cl.
CPC ............ *D21H 17/01* (2013.01); *D21B 1/32* (2013.01); *D21J 1/00* (2013.01); *D21H 17/08* (2013.01); *D21H 17/49* (2013.01); *Y02W 30/646* (2015.05); *Y10T 428/249925* (2015.04)

(58) Field of Classification Search
USPC ............ 162/181.6, 4, 189, 5, 198; 423/165; 428/292.4
See application file for complete search history.

(56) References Cited

U.S. PATENT DOCUMENTS

| | | | |
|---|---|---|---|
| 3,895,998 A | | 7/1975 | Haywood et al. |
| 3,909,470 A | | 9/1975 | Lambuth et al. |
| 4,303,019 A | | 12/1981 | Haataja et al. |
| 4,481,072 A | * | 11/1984 | Grudinin et al. ............... 162/16 |
| 5,137,599 A | | 8/1992 | Maxham |
| 5,290,454 A | | 3/1994 | Dorica et al. |
| 5,346,930 A | * | 9/1994 | Maine et al. ................. 523/164 |
| 5,374,474 A | * | 12/1994 | Pratt et al. .................... 428/220 |
| 5,478,441 A | | 12/1995 | Hamilton |

(Continued)

FOREIGN PATENT DOCUMENTS

| | | |
|---|---|---|
| CA | 2353880 | 6/2000 |
| EP | 0805231 | 11/1997 |

OTHER PUBLICATIONS

ANSI A208.2-2002 document.*

(Continued)

*Primary Examiner* — Anthony J Frost
(74) *Attorney, Agent, or Firm* — Bereskin & Parr LLP/S.E.N.C.R.L., s.r.l.

(57) ABSTRACT

There is provided a fiberboard, such as a MDF fiberboard or a HDF fiberboard, comprising wood fibers, a binder, and a sludge such as a pulp and a paper sludge. The sludge can be, for example, chosen from a primary pulp and paper sludge, a secondary pulp and paper sludge, a de-inking sludge, and mixtures thereof.

26 Claims, 3 Drawing Sheets

(56) References Cited

U.S. PATENT DOCUMENTS

| | | | |
|---|---|---|---|
| 5,496,441 A | | 3/1996 | Tran |
| 5,520,777 A | | 5/1996 | Shisko |
| 5,536,371 A | | 7/1996 | Verhoff |
| 5,562,832 A | * | 10/1996 | McOnie et al. ............. 210/710 |
| 5,582,682 A | | 12/1996 | Ferretti |
| 5,593,625 A | | 6/1997 | Riebel et al. |
| 5,772,847 A | | 6/1998 | Simpson et al. |
| 5,919,424 A | | 7/1999 | Klyosov et al. |
| 6,207,015 B1 | | 3/2001 | Templer et al. |
| 6,306,241 B1 | | 10/2001 | Chiu |
| 6,589,660 B1 | * | 7/2003 | Templeton et al. ........... 428/452 |
| 6,602,451 B1 | * | 8/2003 | Korai et al. .................... 264/83 |
| 7,431,979 B2 | | 10/2008 | Drafenauer |
| 7,527,856 B2 | | 5/2009 | Thiers et al. |
| 7,884,337 B2 | | 2/2011 | Hasegawa et al. |
| 2003/0030176 A1 | * | 2/2003 | Monovoukas et al. ....... 264/211 |

OTHER PUBLICATIONS

American National Standard; "Medium Density Fiberboard (MDF) for Interior Applications", Composite Panel Association 18922 Premiere Court, Gaithersburg, MD 20879-1569, ANSI A208-2002, 2002.

Geng et al., "Geng et al.": "Characteristics of Paper Mill Sludge and its Utilization for the manufacture of Medium Density Fiberboard", Wood and Fiber Science, 39(2), Apr. 2007, pp. 345-351.

Geng et al., "Effects of Hot-Pressing Parameters and Wax Content on the Properties of Fiberboard made from Paper Mill Sludge", Wood and Fiber Science, 38(4), Oct. 2006, pp. 736-741.

Davis et al.: "The Incoporation of Paper Deinking Sludge into Fiberboard", Forest Products Journal, 54(9), 2003, pp. 46-54.

Zauscher et al.: "Pulp Extrusion: A New Processing Method for Recycling Recovered Wastepaper and Papermill Sludge and its Application for Building Materials", Proceedings of the Conference on the Use of Recycled Wood and Paper in Building Applications, 1996, pp. 68-78.

Ozturk et al.: "Sludge Utilization and Redction Experiences in the Pulp and Paper Industry", Water Science and Technologu, vol. 26, No. 9-11, 1992, pp. 2105-2108.

English Abstract of EP0138657 A2 published on Apr. 24, 1985.

English Abstract of CN1773015 published on May 17, 2006.

Slmetric [online], [retrieved on May 1, 2012]. Retrieved from the Internet:<URL: http://www.simetric.co.uk/si_wood.htm>.

The Wood Explorer [online], [retrieved on May 1, 2012]. Retrieved from the Internet:<URL: http://www.thewoodexplorer.com/maindata/we702.html>.

* cited by examiner

FIBERBOARDS, USES AND METHODS OF PREPARATION THEREOF

CROSS-REFERENCE TO RELATED APPLICATION

The present application is a continuation of U.S. application Ser. No. 11/840,456 filed on Aug. 17, 2007 and which claims priority on U.S. provisional application No. 60/822,852 filed on Aug. 18, 2006. These documents are incorporated herein by reference in their entirety.

TECHNICAL FIELD

The present invention relates to improvements in the field of fiberboards or wood panels. In particular, this invention relates to fiberboards that comprise a sludge such as a pulp and paper sludge. The sludge can be a primary pulp and paper sludge, a secondary pulp and paper sludge, a de-inking sludge, or mixtures thereof. The present invention also relates to processes and compositions for preparing such fiberboards that comprise one of the previously-mentioned sludges. For example, the fiberboards can be medium density fiberboards (MDF) or high density fiberboards (HDF).

BACKGROUND OF THE INVENTION

It is nowadays a major concern to considerably reduce the emission of various pollutants in the environment. Moreover, there are presently a lot of concerns and social pressure put on waste rejection. The costs of land burial are high and the cost of fiber is increasing. There is an unbalance regarding supply and demand for woody material.

It would thus be highly desirable to be provided with a solution that would permit to obtain fiberboards or wood panels at lower costs and that would permit to reduce the amount of wood fibers used in the fiberboards or panels production.

SUMMARY OF THE INVENTION

According to one aspect of the invention, there is provided a fiberboard comprising wood fibers; a binder; and a sludge such as a pulp and paper sludge. The sludge can be chosen from a primary pulp and paper sludge, a secondary pulp and paper sludge, a de-inking sludge, and mixtures thereof. The fiberboard can be a medium density fiberboard or a high density fiberboard.

According to another aspect of the invention, there is provided a fiberboard obtained by pressing a mixture comprising wood fibers; a binder; and a sludge such as a pulp and paper sludge. the sludge can be chosen from a primary pulp and paper sludge, a secondary pulp and paper sludge, a de-inking sludge, and mixtures thereof. the fiberboard can be a medium density fiberboard or a high density fiberboard.

According to another aspect of the invention, there is provided a process for preparing a medium density fiberboard or a high density fiberboard. The process comprises pressing a mixture comprising wood fibers; a binder; and a sludge such as a pulp and paper sludge, for example a sludge chosen from a primary pulp and paper sludge, a secondary pulp and paper sludge, a de-inking sludge, and mixtures thereof.

According to another aspect of the invention, there is provided a composition for use in the preparation of a medium density fiberboard or a high density fiberboard. The composition comprises wood fibers; and a sludge such as a pulp and paper sludge, for example a sludge chosen from a primary pulp and paper sludge, a secondary pulp and paper sludge, a de-inking sludge, and mixtures thereof.

According to another aspect of the invention, there is provided a composition for use in the preparation of a medium density fiberboard or a high density fiberboard. The composition comprises wood fibers; a binder; and a sludge such as a pulp and paper sludge, for example a sludge chosen from a primary pulp and paper sludge, a secondary pulp and paper sludge, a de-inking sludge, and mixtures thereof.

According to another aspect of the invention, there is provided a process for treating sludge, the process comprising screening a sludge such as a pulp and paper sludge, for example a sludge chosen from a primary pulp and paper sludge, a secondary pulp and paper sludge, a de-inking sludge, and mixtures thereof, and having a dryness of about 0.5% to about 10%, through a screen of 160 µm or coarser in order to at least partially reduce the amount of ashes contained in the sludge.

According to another aspect of the invention, there is provided a process for treating sludge. The process comprises:
  screening a sludge such as a pulp and paper sludge, for example a sludge chosen from a primary pulp and paper sludge, a secondary pulp and paper sludge, a de-inking sludge, and mixtures thereof, and having a dryness of about 0.5% to about 10%, through a screen of 160 µm or coarser; and
  washing the screened sludge.

According to another aspect of the invention, there is provided a process for treating sludge. The process comprises:
  screening a sludge such as a pulp and paper sludge, for example a sludge chosen from a primary pulp and paper sludge, a secondary pulp and paper sludge, a de-inking sludge, and mixtures thereof, and having a dryness of about 0.5% to about 10%, through a screen of 3500 µm or coarser;
  treating the screened sludge with a desander so as to at least partially remove the sand contained therein;
  screening the desanded sludge through a screen of 160 µm or coarser; and
  washing the screened sludge.

It was found that by incorporating such a sludge in fiberboards (for example MDF and/or HDF fiberboards) by partially replacing the wood fibers by sludge, it was possible to produce a fiberboard, at lower costs, which demonstrated characteristics and properties similar to a standard fiberboard according to the American National Standard for Medium Density Fiberboard For Interior Applications ANSI A208.2-2002 (approved on May 13, 2002). These types of sludge can thus decrease the raw material costs (wood fibers) and generate a gain on the specific energy applied since they are already refined. For the paper mills, such a technology is very interesting since it can considerably reduce or eliminate the costs associated with management of such sludge disposal, for example land burial.

The wood fibers can be virgin wood fibers, post-consumption wood fibers, or a mixture thereof.

The sludge can be present in the fiberboard in an amount of at least 1%, at least 2%, at least 5%, at least 10%, at least 20%, or at least 30%, by weight, based on the total dry weight of the fiberboard. Alternatively, the sludge can be present in the fiberboard in an amount of about 1% to about 40%, about 2% to about 30%, about 4% to about 15%, or about 5% to about 10%, based on the total dry weight of the fiberboard.

The sludge can be obtained from kraft pulping, mechanical pulping or thermomechanical pulping. The sludge can be a primary pulp and paper sludge. It can also be a mixture of primary pulp and paper sludge and a secondary pulp and paper sludge. The sludge can comprise about 50 to about 80% of a primary pulp and paper sludge and about 50 to about 20% of a secondary pulp and paper sludge, based on the total dry weight of the fiberboard. The sludge can be a substantially untreated primary sludge taken from a paper mill.

The sludge can have a silica content, which is less than 30%, less than 20%, less than 10%, or less than 5%, by weight, based on the total dry weight of the sludge.

Alternatively, the sludge can have a silica content which is about 1% to about 30%, or about 1.5% to about 25%, by weight, based on the total dry weight of the sludge. The sludge can have an ashes content, which is less than 30%, less than 20%, less than 10%, less than 5%, less than 2%, less than 1%, by weight, based on the total dry weight of the sludge. Alternatively, the ashes content can be about 0.25% to about 30%, about 0.5% to about 25%, or about 1% to about 15%, by weight, based on the total dry weight of the sludge.

The mixture or composition used for preparing the fiberboards can be dried before being pressed. Before being pressed, the mixture can be dried so as to have a moisture content of less than 15%, less than 12%, or less than 10%. Alternatively, the moisture content can be of about 7% to about 15%, or about 8% to about 12%. The wood fibers, the binder and the sludge can be mixed together in order to obtain the mixture, before drying the mixture. The binder can be mixed with a composition comprising the wood fibers and the sludge in order to obtain the mixture, before drying the mixture. The wood fibers can be refined before being mixed with the binder and/or sludge. The wood fibers and the sludge can be mixed together and then refined before being mixed with the binder.

In the compositions of the present invention, the sludge can be present in an amount of at least 0.3%, at least 0.5%, at least 0.7%, at least 1%, at least 2%, at least 5%, at least 10%, at least 20%, or at least 30% by weight, based on the total dry weight of the composition. Alternatively, the sludge can be present in the composition in an amount of about 1% to about 40%, about 2% to about 30%, about 3% to about 20%, about 4% to about 15%, or about 5% to about 10%, based on the total dry weight of the composition. The composition can comprise an antibacterial agent. The antibacterial agent can be present in the composition in an amount of at least 0.1%, or at least 0.5% based on the total dry weight of the composition. The agent can also be present in an amount of about 0.1% to about 1.0%.

The fiberboards can have an internal bond strength of at least 0.35 N/mm$^2$, at least 0.4 N/mm$^2$, at least 0.65 N/mm$^2$, at least 0.80 N/mm$^2$, at least 1.30 N/mm$^2$, at least 1.40 N/mm$^2$, at least 1.50 N/mm$^2$, at least 1.70 N/mm$^2$, at least 1.80 N/mm$^2$, at least 1.85 N/mm$^2$, at least 1.90 N/mm$^2$, or at least 1.95 N/mm$^2$. Alternatively, the fiberboards can have an internal bond strength of about 0.35 N/mm$^2$ to about 1.95 N/mm$^2$, about 1.3 N/mm$^2$ to about 1.98 N/mm$^2$ about 1.4 N/mm$^2$ to about 1.95 N/mm$^2$, about 1.45 N/mm$^2$ to about 1.85 N/mm$^2$ about, or about 0.40 N/mm$^2$ to about 1.1 N/mm$^2$.

The fiberboards can be high density fiberboards having a density of at least 800 kg/m$^3$, at least 825 kg/m$^3$, at least 850 kg/m$^3$, at least 875 kg/m$^3$, or at least 900 kg/m$^3$. Alternatively, the fiberboards can have a density of about 800 kg/m$^3$ to about 1450 kg/m$^3$, about 800 kg/m$^3$ to about 950 kg/m$^3$, or about 850 kg/m$^3$ to about 950 kg/m$^3$.

The fiberboards can be medium density fiberboards having a density of at least 500 kg/m$^3$, at least 600 kg/m$^3$ or at least 735 kg/m$^3$. Alternatively, the fiberboards can have a density of about 500 kg/m$^3$ to about 800 kg/m$^3$ or of about 600 kg/m$^3$ to about 800 kg/m$^3$ The binder can be, for example, chosen from formaldehyde-based resins, isocyanate-based resins, and mixtures thereof. The binder can also be a formaldehyde-based resin chosen from urea-formaldehyde resins, phenol-formaldehyde resins, melamine-urea-formaldehyde resins, and mixtures thereof. Alternatively, the binder can be polymethyldiisocyanate, a phenol-formaldehyde resin or an urea-formaldehyde resin.

The fiberboards can further comprise an antibacterial agent. The antibacterial agent can be present in the fiberboard in an amount of at least 0.1%, or at least 0.5% based on the total dry weight of the fiberboard. Alternatively, the antibacterial agent can be present in the board in an amount of about 0.1% to about 1.0%. The antibacterial agent can be, for example, chosen from sodium hypochlorite, hydrogen peroxide, sodium benzoate, sodium azide, and mixtures thereof.

As previously indicated, the sludge can be treated before being used for preparing fiberboards. In fact, the sludge can be, before being passed through a screen of 160 μm or coarser, being screened through a screen of 3500 μm or coarser. The process can further comprises passing a water stream in a counter-current manner through the sludge so as to facilitate desanding the sludge. The sludge can be washed by maintaining its dryness at about 0.5% to about 3.5%. The sludge can be washed at least once with water having a temperature of about 40° C. to about 80° C. The sludge can be agitated while being washed. The sludge before being screened, can be diluted with water having a temperature of at least 50° C. and it can then be agitated, thereby obtaining the solid content in solution of about 0.5% to about 10%.

The sludge can also be treated so as to selectively remove clay and/or fines of the type P200 from the sludge. The clay and/or fines, for example of the type P200, can be removed from the sludge by treating the sludge with a centrifugal strainer, a centrifugal screen, a pressure screen, or a pressure inclined-screen.

The sludge (treated or not) can be mixed with wood fibers so as to obtain a mixture and then, refining the mixture. The refined mixture can be mixed with a binder so as to obtain a composition. Such a composition can also be dried and then it can be compressed so as to obtain the desired fiberboards.

According to another embodiment of the present invention, there is provided in a medium density fiberboard or a high density fiberboard made by pressing a mixture comprising wood fibers and a resin, the improvement wherein at least a portion of the wood fibers are replaced with a sludge chosen from a primary pulp and paper sludge, a secondary pulp and paper sludge, a de-inking sludge, and mixtures thereof.

According to another embodiment of the present invention, there is provided in a medium density fiberboard or a high density fiberboard comprising wood fibers and a resin, the improvement wherein at least a portion of the wood fibers are replaced with recycled fibers obtained from a sludge chosen from a primary pulp and paper sludge, a secondary pulp and paper sludge, a de-inking sludge, and mixtures thereof.

BRIEF DESCRIPTION OF DRAWINGS

In the following drawings, which represent by way of example only, some embodiments of the invention.

DETAILED DESCRIPTION OF PREFERRED EMBODIMENTS

Further features and advantages of the invention will become more readily apparent from the following description of some embodiments as illustrated by way of examples only in the appended drawings wherein:

The following non-limiting examples further illustrate the invention.

EXAMPLES

In the present invention, the sludge used can be used as is, i.e. without requiring any treatment or purification. Alternatively, in some cases the sludge can be optionally treated before being used for the production of fiberboards. For example, the sludge can be treated in order to reduce and/or eliminate undesired odours, reduce and/or eliminate microorganisms, reduce and/or eliminate silica, reduce and/or eliminate fines.

When preparing fiberboards, the gluing step can be carried out at the same time or just after the refining step. In this case, sludge can be added before refiner(s). But if it is not the case, sludge can be added after refiner(s) if the sludge's parameters allow it. In accordance with the sludge source, they may contain coarse fibrous particulars, called shavings, which can be refined. Use of coarse sieves allow to withdraw these sludge particles to refine them with fibers. This has been tested with a sieves of 3540 μm opening and then washed two times. Shavings can be withdrawn at first if grit removal is necessary.

As previously indicated, the sludge can be optionally treated before using it in the production of fiberboards. The following possibilities can thus be applied. If a treatment is necessary to decrease the ash content (which comprises silica) due to clay and/or sand, one of the three following methods can be used.

A. Screening of the Sludge:

This method comprises screening the sludge at a consistency of about 1% to about 5%. For example, a screen opening of 160 μm can be used. This treatment allowed to decrease ash content from 27% to 8.7% on sludge. The filtrate was disposed.

B. Screening and Rinsing the Sludge

Figure 2:
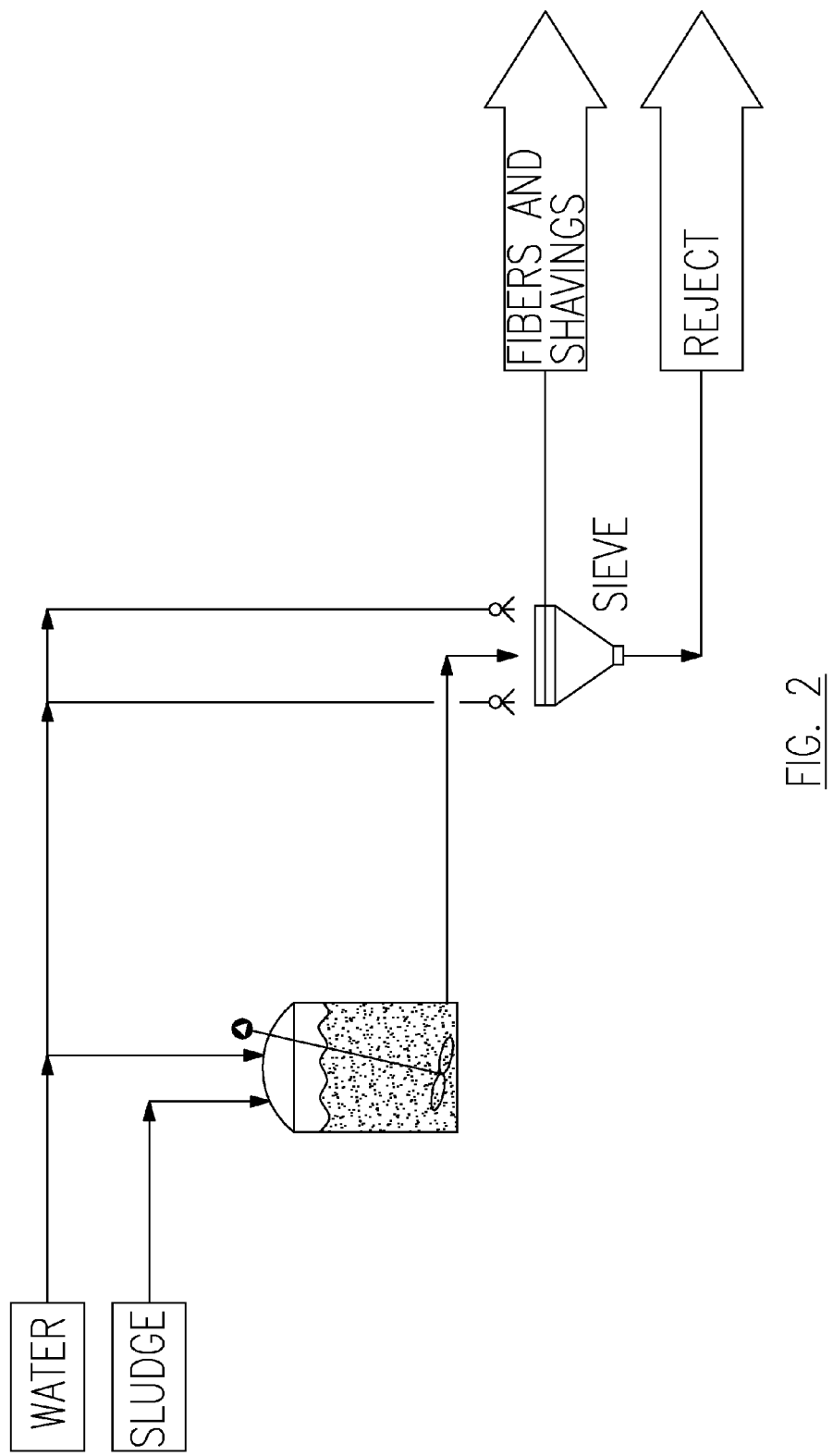
FIG. 2 is schematic representation illustrating a process, according to another aspect of the present invention, for treating a sludge that requires some treatment before using it in the manufacture of fiberboards.

Such a method is similar to the method schematically represented in FIG. 2. This method comprises screening the sludge at a consistency of about 1 to about 5%. The sludge was rinsed with tap water few times. Better results were obtained with 2 rinses. For example, the screen opening used was 160 μm (sieve). Efficiency was increased when sludge was diluted to consistency of about 1% with hot water (60° C.) and agitated during 5 minutes. This treatment allowed to decrease ash content from 27% to 0.7% on sludge. The filtrate was disposed (reject). Fibers containing shavings were recovered.

C. Removing Sand, Rinsing and Screening the Sludge

Figure 3:
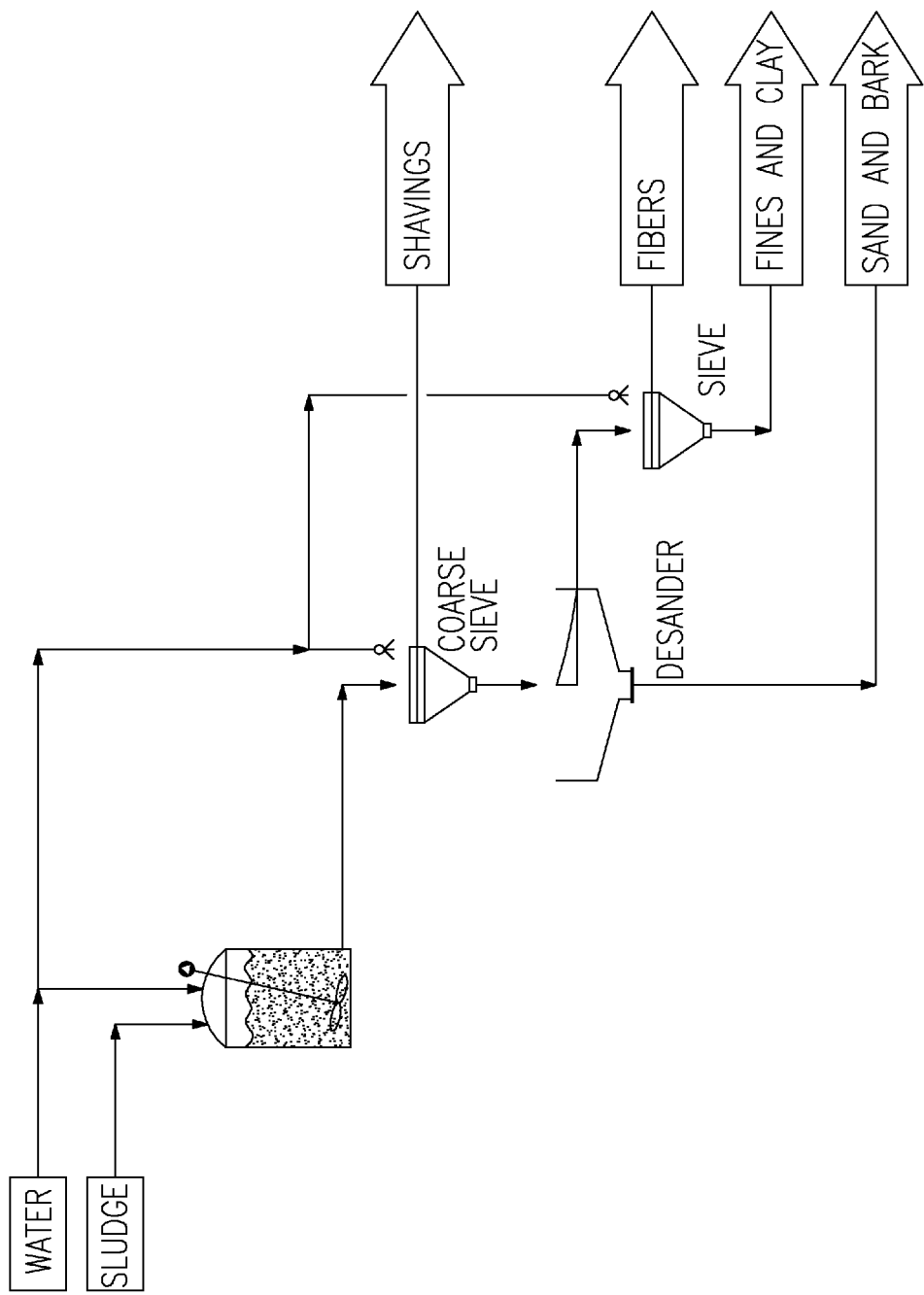
FIG. 3 is schematic representation illustrating a process, according to another aspect of the present invention, for treating a sludge that requires some treatment before using it in the manufacture of fiberboards.

This method, which is similar to the method schematically represented in FIG. 3, comprises removing sand and bark from sludge using a desander. After sand removal, sludge is screened at an opening of 160 μm (sieve) and then, rinsed with tap water few times. Very interesting results were obtained when rinsing 2 times. Such a step permits to efficiently remove interesting quantities of fines and clay. Optionally, before passing the sludge in the desander, it is possible to pass it into a coarse sieve (3500 μm or coarser) in order to substantially remove shavings.

Alternatively, clay and fines could also be removed with a centrifugal, a pressurized screen, a pressurized inclined screen or by centrifugation.

Addition of an oxidative agent such as sodium hypochlorite at 0.5% can be made so as to stabilize the sludge during at least 96 hours. Combined to a bacteriostat agent, the period can be extended to 7 days. After having simulated thermal treatments, fresh sludge had a bacterial counting similar to standard MDF panel counting. It was shown that the addition of an oxidative agent was not necessary depending upon storage conditions.

Some results demonstrated that sodium hypochlorite at 0.1% v/v of concentration has a bactericide effect on short term (48 hours). While at concentration at 0.2% v/v, sodium hypochlorite allows sludge to keep for 7 days a bacterial counting lower than the factory raw material.

The results shown in Table 1 demonstrated that the amount of microorganisms is not higher in a sludge-containing panel as opposed to a standard panel. The Table 1 shows microbiological results for different steps in the panel production.

TABLE 1

|  |  |  | Yeast and molds CFU/g | Totals coliforms CFU/g | E. coli CFU/g | Entérococcus CFU/g | HBAA Counting | Contaminants |
|---|---|---|---|---|---|---|---|---|
| Primary sludge | 100% | #1 | 865 | 405 | <3 | 81 | 11 300 | *Bacillus* positive GRAM, negative oxidase, positive catalase. Filamentous negative GRAM, negative oxidase, positive catalase. |
|  |  | #2 | 250 | 280 | <3 | 30 | 14 150 |  |
| After refiner | 0% | #1 | <10 | <10 | <10 | <10 | 39 800 | *Bacillus* positive GRAM, negative oxidase, positive catalase. |
|  |  | #2 | <10 | <10 | <10 | <10 | 39 200 |  |
|  | 5% | #1 | <10 | <10 | <10 | <10 | 25 900 | *Bacillus* positive GRAM, negative oxidase, positive catalase. |
|  |  | #2 | 10 | <10 | <10 | <10 | 23 900 |  |

TABLE 1-continued

| | | | Yeast and molds CFU/g | Totals coliforms CFU/g | E. coli CFU/g | Entérococcus CFU/g | HBAA Counting | Contaminants |
|---|---|---|---|---|---|---|---|---|
| | 10% | #1 | <10 | <10 | <10 | <10 | 7000 | *Bacillus* positive GRAM, negative |
| | | #2 | 10 | <10 | <10 | <10 | 9300 | oxidase, positive catalase. |
| At former | 0% | #1 | <10 | <10 | <10 | <10 | <10 | None |
| | | #2 | <10 | <10 | <10 | <10 | <10 | |
| | 5% | #1 | <10 | <10 | <10 | <10 | <10 | None |
| | | #2 | <10 | <10 | <10 | <10 | <10 | |
| | 10% | #1 | 30 | <10 | <10 | <10 | <10 | None |
| | | #2 | <10 | <10 | <10 | <10 | <10 | |
| Rough panel | 0% | #1 | 10 | <10 | <10 | <10 | <10 | None |
| | | #2 | 10 | <10 | <10 | <10 | <10 | |
| | 5% | #1 | <10 | <10 | <10 | <10 | <10 | None |
| | | #2 | <10 | <10 | <10 | <10 | <10 | |
| | 10% | #1 | 10 | <10 | <10 | <10 | <10 | None |
| | | #2 | 10 | <10 | <10 | <10 | <10 | |

HBAA = Heterotrophic bacteria aerobic and anaerobic facultative

It should be noted that in Table 1, primary sludge results correspond to CFU/g anhydrous on sludge. In all other cases, units are CFU/g humid. This explains detection threshold of 3 CFU/g for primary sludge and 10 CFU/g for all others.

In the following examples, which refer to the preparation of fiberboards, the latter have been characterized using standard methods such as:
Internal Bonds: ASTM D1037-99
Surface bonds: ASTM D1037-99
Modulus of Rupture (MOR): ASTM D1037-99
Modulus of Elasticity (MOE): ASTM D1037-99
Stiffness: ASTM D1037-99
Thickness Swelling: ASTM D1037-99
Thickness Edge Swelling: EN 13329-2000

Example 1

Figure 1:
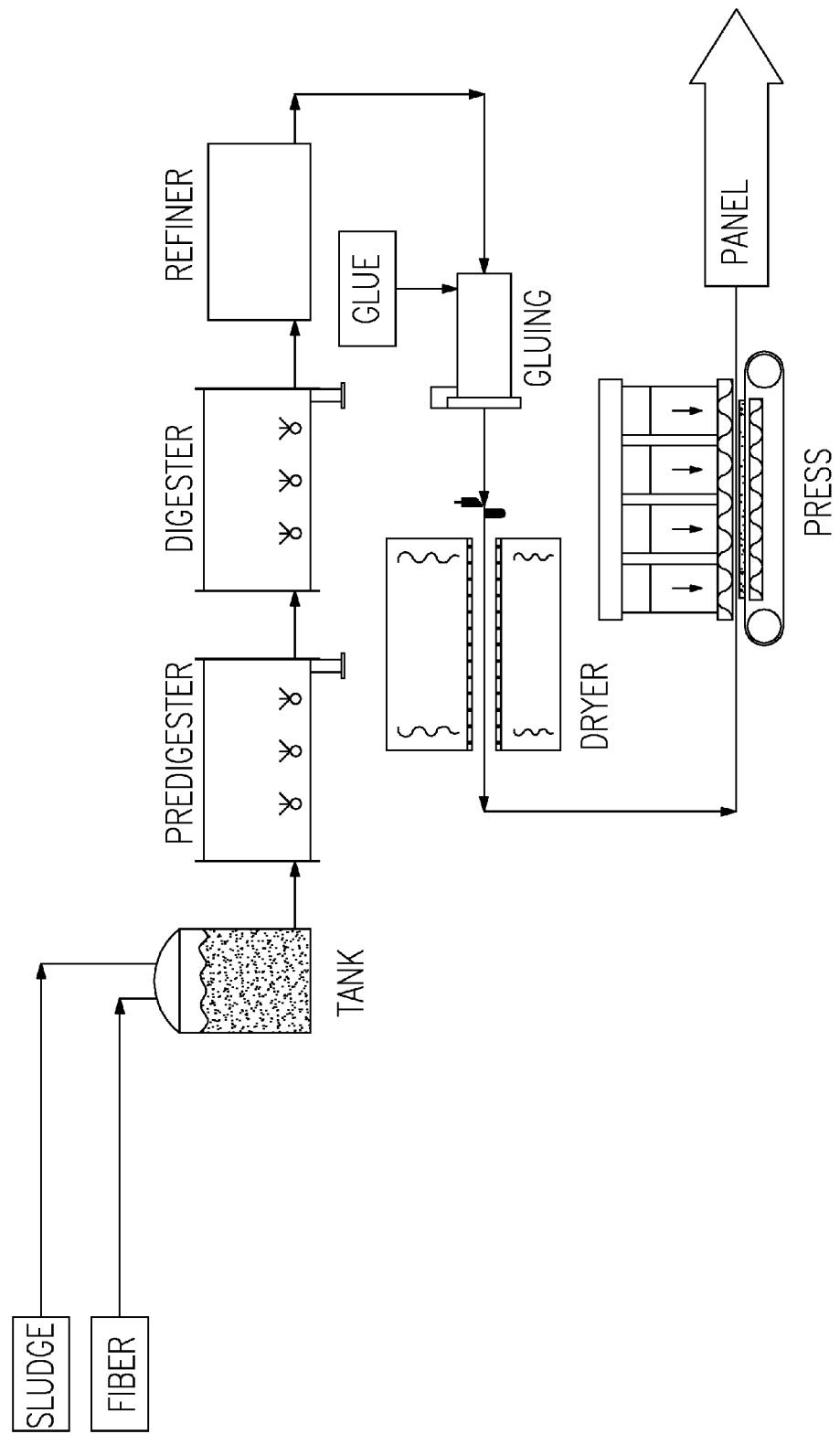
FIG. 1 is a schematic representation illustrating how are prepared fiberboards according to one aspect of the present invention.

A process as shown in FIG. 1 was carried out in order to produce panels or fiberboards. FIG. 1 thus schematically represents the process that was carried out. The sludge used came from a pulp and paper factory, which produces newspaper with thermomechanic pulp without addition of clay. Primary and secondary sludges were mixed before being pressed. Primary sludge represents 63% and secondary sludge 37%. Sludges contained 74% of water. No treatment and no biocide have been done on sludge.

The sludge was mixed with wood fibers in a half and half proportion (anhydrous weight) before being stored in a silo. The wood fibers content was about 50% hardwood and 50% softwood. Sludge proportion injected in the process was dosed with metering screws. Sludge incorporation tests were at 5% and 10% by weight, based on the total dry weight of the fiberboard.

Sludge and fibers were stepped forward to the predigester and the digester. Then, they were refined. During the test, specific energy of the refiner drop-off from 348 kW/T to 276 kW/T.

A mixture comprising the fibers, the sludge, an urea-formaldehyde resin (16% by weight based on the dry weight of the wood fibers), a steochiometric excess of urea (0.9% by weight based on the dry weight of the wood fibers), and wax/paraffin (1% by weight based on the dry weight of the wood fibers) was stepped forward to the former (inlet of the press) and finally, through the continuous press (Siempelkamp™). The so-formed products were HDF panels having a 6.6 mm thickness and a density of 900 kg/m³. Fiber pH increased from 5.23 to 5.34 during sludge insertion of 5%.

Internal bonds strength was 1.91 N/mm² for the control panel, 1.81 N/mm² for the panels with a sludge content of 5% and 1.64 N/mm² for the panels having a sludge content of 10%.

Example 2

This example was also carried out as shown in FIG. 1. The sludge used came from a pulp and paper factory which produces newspaper with thermomechanic pulp without addition of clay. Only primary sludge was used. The sludge contained 73% of water. No treatment and no biocide have been done on sludge.

The sludge was mixed with wood fibers in a half and half proportion (anhydrous weight) before being stored in a silo. The wood fibers content was about 40% hardwood and 60% softwood. The sludge proportion injected in the process was dosed with metering screws. Sludge incorporation tests were at 5.7% and 10% by weight, based on the total dry weight of the fiberboard of the final mixture. Sludge and fibers are stepped forward to the predigester and the digester. After, they were refined. During the test, specific energy of the refiner was constant.

Fiber and sludge were stepped forward to the former ((inlet of the press) and into the continuous press. The product was HDF panels of 6.6 mm thickness and a density of 900 kg/m³. Average length of fiber only was 0.726 mm and sludge only was 0.583 mm. During the test, the average length of mixture with sludge content of 5.7% was 0.686 mm and was 0.688 mm for mixture with sludge content of 10%. Table 2 represents results obtained for rough panel and Table 3 represents results obtained for sanded panels. The test duration was 3 hours.

TABLE 2

| Panel | Average internal bonds strength (N/mm²) | Average density (kg/m³) | Average surface density (kg/m³) | Minimal core density (kg/m³) | Press speed (mm/sec) | Mat moisture (%) |
|---|---|---|---|---|---|---|
| Control | 1.968 | 930 | 1 118 | 870 | 285 | 9.0 |
| 5.7% of sludge | 1.972 | 911 | 1 119 | 824 | 285 | 9.0 |
| 10% of sludge | 1.903 | 935 | 1 153 | 865 | 285 | 9.2 |

TABLE 3

| Panel | Average internal bonds strength (N/mm²) | Average density (kg/m³) | Average surface density (kg/m³) | Minimal core density (kg/m³) | Average MOR (N/mm²) | Average MOE (N/mm²) | Edge swelling (%) | Heaving ASTM (%) | Water absorption (%) | Hardness |
|---|---|---|---|---|---|---|---|---|---|---|
| Control | 2.063 | 882 | 1 088 | 818 | 48 | 5133.0 | 16.46 | 9.58 | 12.01 | 9 757 |
| 5.7% of sludge | 1.849 | 879 | 1 090 | 820 | 38 | 4291.0 | 17.12 | 9.17 | 11.85 | 9 814 |
| 10% of sludge | 1.503 | 882 | 1 117 | 837 | 43 | 4885.0 | 16.67 | 9.49 | 12.74 | 9 320 |

Example 3

Example 3, was carried out in a similar manner as shown in FIG. 1. The sludge used came from a pulp and paper factory which produces newspaper with thermomechanic pulp without addition of clay. Primary sludge only was used. Sludges contained 70% of water. No treatment and no biocide have been done on sludge.

In the panel factory, the sludge was mixed with wood fibers in proportion of half and half (anhydrous weight) before being stored in a silo. The wood fibers content was about 20% hardwood and 80% softwood. Sludge proportion injected in the process was dosed with metering screws. Sludge incorporation tests was 6% by weight, based on the total dry weight of the fiberboard. Sludge and fibers were stepped forward to the predigester and the digester. After, they were refined.

Fiber and sludge were stepped forward to the former (inlet of the press) and finally, into the continuous press. The product was HDF panels of 7.6 mm thickness and a density of 850 kg/m³. Large amount of water contained in sludge forced to slow down press speed from 310 mm/s to 265 mm/s during the test. The temperature of air dryer was increased of 10° C. Average length of sludge fiber was 0.578 mm and 0.616 mm for fiber only. Table 4 represents results obtained for rough panels and Table 5 represents results obtained for sanded panel.

which are substantially the same than conventional fiberboards (control). In fact, the values obtained for the various parameters tested in Tables 2 to 5 are substantially the same for fiberboards which include the sludge and for the conventional fiberboards.

In view of Examples 1 to 3 related to HDF fiberboards, the person skilled in the art would clearly understand how to prepare MDF fiberboards. In fact, it is well known in the present art that one the main differences between preparation of HDF and MDF reside in the pressure applied to the fiberboards i.e. HDF fiberboards require more pressure since they have a higher density. The person skilled in the art would also understand that various parameters will be modified depending on the final desired characteristics of the produced fiberboards.

Example 4

In Example 4, a sludge having a water content of 95.17% and ash content of 25.6% (combustion ash at 525° C.) was used. It was a primary sludge only and this sludge came from a thermomechanical process.

The process carried out in Example 4, was similar to the process schematically represented in FIG. 2. The sludge was diluted to 1% solid weight, vigorously stirred during 5 minutes, screened with an opening of 3.6 mm and rinsed twice. After, having vigorously stirred the filtrate during 5

TABLE 4

| Panel | Average internal bonds strength (N/mm²) | Average density (kg/m³) | Average surface density (kg/m³) | Minimal core density (kg/m³) | Press speed (mm/sec) | Mat moisture (%) |
|---|---|---|---|---|---|---|
| Control | 1.450 | 849 | 1 067 | 753 | 303 | 9.4 |
| 6.0% of sludge | 1.582 | 851 | 1 133 | 734 | 298 | 9.4 |
| Specification | min 1.400 | 850 ± 5% | min 1 075 | min 730 | 280 | 8.5-10.5 |

TABLE 5

| Panel | Average internal bonds strength (N/mm²) | Average density (kg/m³) | Average surface density (kg/m³) | Minimal core density (kg/m³) | Average MOR (N/mm²) | Average MOE (N/mm²) | Edge swelling (%) | Heaving ASTM (%) | Water absorption (%) | Hardness | Silicate content (%) |
|---|---|---|---|---|---|---|---|---|---|---|---|
| Control | 1.716 | 856 | 1 125 | 737 | 44.4 | 5255.6 | 15.55 | 7.66 | 11.85 | — | 0.041 |
| 6.0% of sludge | 1.597 | 851 | 1 125 | 742 | 49.5 | 5733.3 | 14.56 | 7.29 | 12.102 | — | 0.0586 |
| Specification | min 1.400 | 850 ± 5% | min 1 075 | min 730 | min 38 | min 4 500 | max 16 | max 8 | — | — | — |

As it can be seen from Tables 2 to 5, it was clearly demonstrated that the obtained fiberboards have properties minutes, it was screened through openings of 160 μm and rinse twice. The screen with openings of 3.6 mm holded 9.8%. Of the solute. These shavings had an ash content of 1%. The screen with an opening of 160 μm holded 53% of solid. These fibers had an ash content of 13.5%. This high value was partially caused by sand. The treated sludge was then ready to be used in the preparation of fiberboards.

Example 5

In Example 5, the sludge used was the same than in Example 4. The process carried out in Example 5, was similar to the one schematically represented in FIG. 3. The sludge was diluted to 1% solid weight, vigorously stirred during 5 minutes, screened through openings of 3.6 mm (coarse sieve) and rinsed twice. The shavings (removed) represented 7.6% of solid. They were characterized by 1.21% of ash content. After the filtrate was vigorously stirred during 5 minutes and the sand was removed with a desander. The reject was sand and small bark particles. They represent 7.19% of solid weight with an ash content of 1.1%. The supernatant was screened with openings of 160 μm (sieve) and then, rinsed twice. The retentate was 37.4 g of solid with a ash content of 11.5%. The treated sludge was then ready to be used in the preparation of fiberboards.

While the invention has been described in connection with specific embodiments thereof, it will be understood that it is capable of further modifications and this application is intended to cover any variations, uses, or adaptations of the invention following, in general, the principles of the invention and including such departures from the present disclosure as come within known or customary practice within the art to which the invention pertains and as may be applied to the essential features hereinbefore set forth, and as follows in the scope of the appended claims.

What is claimed is:

1. A fiberboard comprising:
   wood fibers;
   a binder present in said fiberboard in an amount of about 18% or less by weight, based on the total dry weight of the fiberboard; and
   an untreated sludge chosen from a primary pulp and paper sludge, a secondary pulp and paper sludge, and mixtures thereof,
   wherein said fiberboard is a medium density fiberboard or a high density fiberboard having a density of about 500 to about 1000 kg/m$^3$.

2. The fiberboard of claim 1, wherein said wood fibers are virgin wood fibers, post-consumption wood fibers, or a mixture thereof.

3. The fiberboard of claim 1, wherein said sludge is present in said fiberboard in an amount of at least 1% by weight, based on the total dry weight of the fiberboard.

4. The fiberboard of claim 1, wherein said sludge is present in said fiberboard in an amount of at least 5% by weight, based on the total dry weight of the fiberboard.

5. The fiberboard of claim 1, wherein said sludge is present in said fiberboard in an amount of at least 10% by weight, based on the total dry weight of the fiberboard.

6. The fiberboard of claim 1, wherein said sludge is present in said fiberboard in an amount of about 1% to about 40% by weight, based on the total dry weight of the fiberboard.

7. The fiberboard of claim 1, wherein said sludge is present in said fiberboard in an amount of about 1% to about 15% by weight, based on the total dry weight of the fiberboard.

8. The fiberboard of claim 1, wherein said sludge is a primary pulp and paper sludge.

9. The fiberboard of claim 1, wherein said sludge is a mixture of primary pulp and paper sludge and a secondary pulp and paper sludge.

10. The fiberboard of claim 1, wherein said sludge is an untreated primary sludge taken from a paper mill.

11. The fiberboard of claim 1, wherein said fiberboard has an internal bond strength of at least 1.30 N/mm$^2$.

12. The fiberboard of claim 3, wherein said fiberboard has an internal bond strength of at least 1.40 N/mm$^2$.

13. The fiberboard of claim 1, wherein said fiberboard has an internal bond strength of at least 1.70 N/mm$^2$.

14. The fiberboard of claim 1, wherein said fiberboard has an internal bond strength of at least 1.90 N/mm$^2$.

15. The fiberboard of claim 7, wherein said fiberboard has an internal bond strength of about 1.3 N/mm$^2$ to about 1.98 N/mm$^2$.

16. The fiberboard of claim 15, wherein said fiberboard has a density of about 800 kg/m$^3$ to about 1000 kg/m$^3$.

17. The fiberboard of claim 1, wherein said fiberboard has a density of about 900 kg/m$^3$ to about 1000 kg/m$^3$.

18. The fiberboard of claim 1, wherein said fiberboard has a density of about 800 kg/m$^3$ to about 950 kg/m$^3$.

19. The fiberboard of claim 1, wherein said binder is chosen from formaldehyde-based resins, isocyanate-based resins, and mixtures thereof.

20. The fiberboard of claim 1, wherein said sludge is present in said fiberboard in an amount of 15% or less by weight, based on the total dry weight of the fiberboard.

21. The fiberboard of claim 1, wherein said sludge is present in said fiberboard in an amount of about 2% to about 10% by weight, based on the total dry weight of the fiberboard.

22. The fiberboard of claim 1, wherein said sludge is present in said fiberboard in an amount of about 5% by weight, based on the total dry weight of the fiberboard.

23. The fiberboard of claim 1, wherein said sludge is present in said fiberboard in an amount of about 10% by weight, based on the total dry weight of the fiberboard.

24. The fiberboard of claim 20, wherein said fiberboard has a density of about 800 kg/m$^3$ to about 1000 kg/m$^3$.

25. The fiberboard of claim 24, wherein said binder is present in said fiberboard in an amount of about 15% or less by weight, based on the total dry weight of the fiberboard.

26. The fiberboard of claim 24, wherein said binder is present in said fiberboard in an amount of about 12.5% or less by weight, based on the total dry weight of the fiberboard.

* * * * *